T. F. A. MAHER.
NUT LOCK.
APPLICATION FILED SEPT. 1, 1910.
975,145.
Patented Nov. 8, 1910.
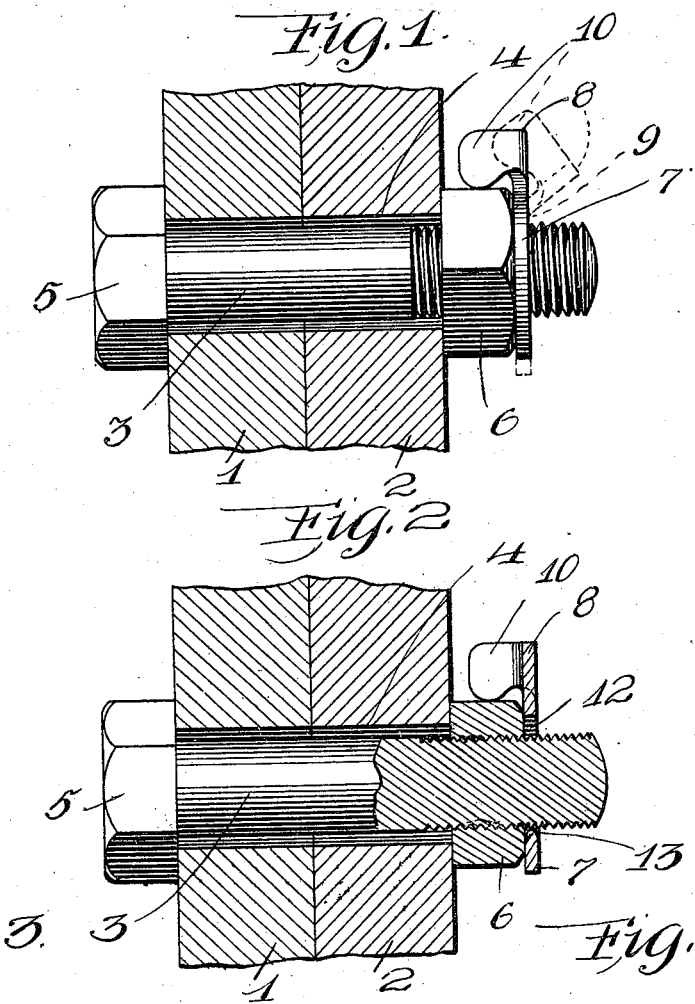
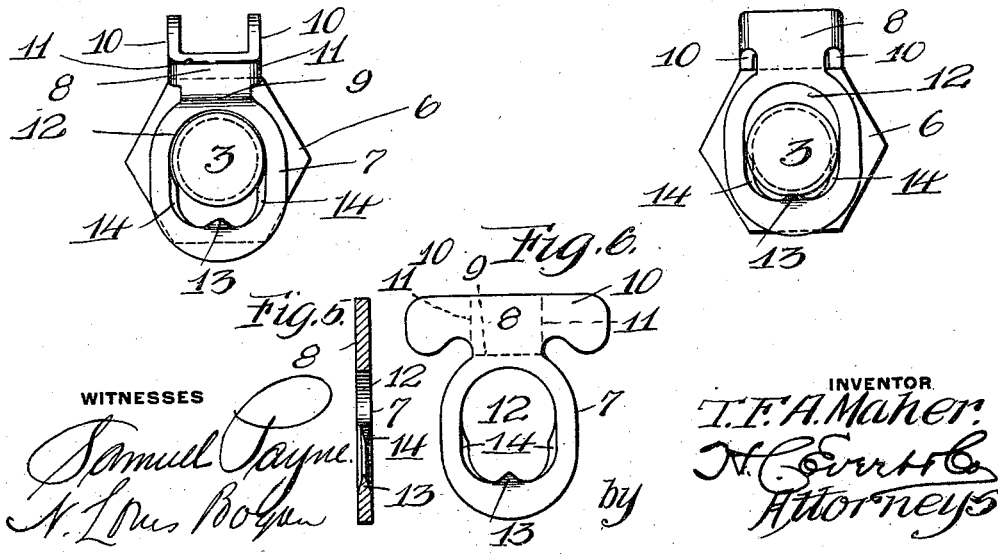
WITNESSES
INVENTOR
T. F. A. Maher.

UNITED STATES PATENT OFFICE.

THOMAS F. A. MAHER, OF PITTSBURG, PENNSYLVANIA.

NUT-LOCK.

975,145.  Specification of Letters Patent.  Patented Nov. 8, 1910.

Application filed September 1, 1910. Serial No. 580,056.

*To all whom it may concern:*

Be it known that I, THOMAS F. A. MAHER, a citizen of the United States of America, residing at Pittsburg, in the county of Allegheny and State of Pennsylvania, have invented certain new and useful Improvements in Nut-Locks, of which the following is a specification, reference being had therein to the accompanying drawing.

This invention relates to nut locks, and the objects of my invention are, first, to furnish a bolt and nut with positive and reliable means for retaining the nut upon a bolt; second, to provide a nut lock that can be advantageously used in connection with rail joints, rolling stock, bridges and structure subjected to vibrations which have a tendency to loosen nuts upon bolts; third, to provide a nut locking device that can be easily and quickly installed by unskilled labor; fourth, to provide a nut lock that can be used in connection with the present type of bolt and nut without injuring either, and fifth, to provide a nut locking device that is simple in construction, durable and inexpensive to manufacture.

I attain the above objects by a mechanical construction that will be hereinafter specifically described and then claimed.

Reference will now be had to the drawing, wherein:—

Figure 1 is a side elevation of a nut lock in accordance with this invention, Fig. 2 is a longitudinal sectional view of the nut lock, Fig. 3 is an end view of the nut lock in an open position, Fig. 4 is a similar view showing the nut lock in a closed position, Fig. 5 is a vertical sectional view of the lock prior to having the nut gripping lugs thereof bent, and Fig. 6 is an elevation of the same.

In the drawing the reference numerals 1 and 2 denote, by the way of an example, two pieces of material adapted to be connected by a bolt 3 passing through longitudinally alining openings 4 provided therefor in the material 1 and 2, the bolt having the head 5 thereof engaging the outer side of the piece of material 1 and the threaded end of the bolt protruding from the piece of material 2. 6 denotes a square, hexagon or octagon shaped nut screwed upon the threaded end of the bolt against the outer side of the material 2.

The nut locking device used in connection with the bolt 3 and the nut 6 is preferably made of malleable metal, cut and stamped from sheet metal, the nut lock device comprising an oval-shaped washer 7 having the upper edge thereof provided with an extension 8 adapted to be bent upon the dash line 9, said extension having the vertical edges thereof provided with nut gripping lugs 10 adapted to be bent upon the dash line 11 into parallelism. The oval-shaped washer 7 has an oval opening 12 and the lower wall of this opening is provided with a beveled teat 13. The lower part of the side walls of the opening 12 are provided with beveled diametrically opposed ribs 14, these ribs extending along the side walls of the opening 12 approximately one-half the major axis of said opening.

After the washer has been produced as shown in Figs. 5 and 6 of the drawing, the nut gripping lugs 10 are bent into parallelism and the extension 8 bent downwardly from the outer face of the washer as best shown in Fig. 3 of the drawing and in dotted lines in Fig. 1. The upper part of the opening 12 permits of the washer being placed over the threaded end of the bolt 3 and after it has been seated against the outer face of the nut 6, the washer is driven upwardly whereby the teat 13 and the ribs 14 will engage in the threads of the bolt 3. The extension 8 and the nut gripping lugs 10 thereof are bent forwardly until the lugs 10 grip one of the facets of the nut 6, the extension 8 assuming a position in alinement with the body of the washer 7. The teat 13 and the ribs 14 prevent the displacement of the washer upon the bolt and sufficiently engages the threads of the bolt to prevent the washer from rotating, while the nut gripping lugs 10 of the washer prevent the nut from rotating upon the bolt as long as the washer is retained thereon.

What I claim is:—

In a nut lock, the combination with a bolt and a nut screwed upon said bolt, of a washer adapted to fit upon said bolt against the outer side of said nut and retain said nut upon said bolt, said washer comprising an oval plate having an oval opening formed therein, a beveled teat carried by the lower wall of said opening, beveled diametrically opposed ribs carried by the side walls of said opening and adapted to be shifted into engagement with the threads of said nut by moving said washer upwardly, an extension carried by the upper edge of said washer, and diametrically opposed nut gripping lugs carried by the vertical edges of said extension, said extension and said lugs being bent whereby the lower edges of said lugs will engage one of the facets of said nut, substantially as, and for the purpose herein described.

In testimony whereof I affix my signature in the presence of two witnesses.

THOMAS F. A. MAHER.

Witnesses:
   CRISSY T. HOOD,
   N. LOUIS BOGAN.